(12) United States Patent
Zugel et al.

(10) Patent No.: US 6,449,859 B1
(45) Date of Patent: *Sep. 17, 2002

(54) SPIRIT LEVEL

(75) Inventors: Duane William Zugel, San Diego, CA (US); Emanuel Szumer, Bikat Beit HaKarem (IL)

(73) Assignee: Kapro Industries Ltd., Beit Hakerem (IL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,391

(22) Filed: Apr. 28, 1998

Related U.S. Application Data

(63) Continuation of application No. PCT/IL97/00359, filed on Nov. 7, 1997.
(60) Provisional application No. 60/032,702, filed on Dec. 12, 1996.

(51) Int. Cl.[7] .................................................. G01C 9/32
(52) U.S. Cl. ........................................... 33/451; 33/348
(58) Field of Search .......................... 33/365, 379, 347, 33/348, 348.2, 451, 333, 290, 382; 359/438, 439

(56) References Cited

U.S. PATENT DOCUMENTS

| | | | |
|---|---|---|---|
| 212,823 A | 3/1879 | Stucky | |
| 503,065 A | 8/1893 | Taylor | |
| 999,573 A | * 8/1911 | Lidholm | ...................... 33/290 |
| 1,062,964 A | * 5/1913 | Gesbeck et al. | ............... 33/381 |
| 1,777,429 A | 10/1930 | Charlton | |
| 2,133,598 A | 10/1938 | Torbert, Jr. | |
| 2,466,829 A | 4/1949 | Sprinkel | |
| 2,669,029 A | 2/1954 | Ries | |
| 2,727,314 A | 12/1955 | Dossie et al. | |
| 2,750,677 A | 6/1956 | Wirth | |
| 2,791,036 A | 5/1957 | Gericke | |
| 2,857,678 A | * 10/1958 | Armour, Sr. | .................. 33/381 |
| 3,064,535 A | 11/1962 | Anderson | |
| 3,738,015 A | 6/1973 | De Jong | |
| 4,103,430 A | 8/1978 | Schrader | |
| 4,124,940 A | 11/1978 | Vaida | |
| 4,192,383 A | * 3/1980 | Kirkland et al. | ............. 166/341 |
| 4,660,292 A | * 4/1987 | Richardson | |
| 4,860,459 A | 8/1989 | Dengler | |
| 5,406,714 A | 4/1995 | Baker et al. | |

FOREIGN PATENT DOCUMENTS

| | | | | |
|---|---|---|---|---|
| AU | 111171 | * 2/1939 | ................... | 33/290 |
| DE | 306455 | 11/1917 | | |
| GB | 0212823 | 3/1924 | | |
| GB | 0503065 | 3/1939 | | |
| GB | 2162947 | 2/1986 | | |
| JP | 2-93710 | 7/1990 | | |
| JP | 3-16018 | 2/1991 | | |
| JP | 5-57162 | 7/1993 | | |
| JP | 3006750 | 11/1994 | | |
| JP | 8-101037 | 4/1996 | | |
| PL | 39626 | * 2/1957 | ................... | 33/290 |
| WO | WO 96/03258 | 2/1996 | | |

* cited by examiner

Primary Examiner—Diego Gutierrez
Assistant Examiner—R. Alexander Smith
(74) Attorney, Agent, or Firm—Ladas & Parry

(57) ABSTRACT

A spirit level comprising a body having a level face for setting a surface, at least one bubble vial mounted in the body, the bubble vial having a longitudinal axis generally perpendicular to the level face, and an optical transfer element fixed to the body which transfers an image of the bubble vial to a viewing plane generally parallel to the level face.

7 Claims, 6 Drawing Sheets

SPIRIT LEVEL

This is a continuation of PCT/IL97/00359, filed Nov. 7, 1997, and claims the benefit of provisional application No. 60/032,702, filed Dec. 12, 1996.

FIELD OF THE INVENTION

The present invention relates to spirit levels.

BACKGROUND OF THE INVENTION

Spirit levels, also called bubble levels, are well known instruments used for setting horizontal or vertical surfaces. The level includes a sealed vial containing an air bubble floating in a liquid. The particular surface is considered horizontal or vertical when the air bubble rests between predetermined graduated marks in the vial.

When setting, also called plumbing, a vertical surface with a typical spirit level, the bubble vial is generally perpendicular to the surface being set, with the result that the air bubble must be viewed from a position which does not directly face the surface being set. Unfortunately, it is sometimes awkward or strenuous to view the air bubble from such a position. Adverse lighting conditions can also exacerbate difficulty in reading the bubble from such a position.

U.S. Pat. No. 4,103,430 to Schrader describes a viewing device for a spirit level including a luminescent panel and a pivotable mirror arranged to provide an illuminated image of the air bubble which may be viewed without having to look directly at the air bubble vial. However, the air bubble must still be viewed from a position which does not directly face the surface being set.

SUMMARY OF THE INVENTION

The present invention seeks to provide a novel spirit level wherein the air bubble may be viewed from a position which directly faces a surface being set.

There is thus provided in accordance with a preferred embodiment of the present invention a spirit level including a body having a level face for setting a surface, at least one bubble vial mounted in the body, the bubble vial having a longitudinal axis generally perpendicular to the level face, and an optical transfer element fixed to the body which transfers an image of the bubble vial to a viewing plane generally parallel to the level face.

In accordance with a preferred embodiment of the present invention the optical transfer element enlarges the image. In accordance with another preferred embodiment of the present invention, the optical transfer element diminishes a size of the image. Illumination apparatus may be provided for illuminating the image.

In accordance with a preferred embodiment of the present invention the optical transfer element includes a reflective surface arranged at an angle to the bubble vial and to the viewing plane and which reflects the image of the bubble vial to the viewing plane. The reflective surface may be a mirror or a prism, for example. In accordance with another preferred embodiment of the present invention the optical transfer element includes an electric viewing device.

The optical transfer element may be internally or externally mounted in or on the spirit level. Additionally, the optical transfer element may be detachable from the spirit level.

In accordance with a preferred embodiment of the present invention the optical transfer element is an add-on accessory which may be attached to the spirit level.

There is also provided in accordance with a preferred embodiment of the present invention a method for facilitating viewing a bubble vial of a spirit level while setting a vertical surface, the bubble vial having a longitudinal axis generally perpendicular to the vertical surface, the method including the steps of fixing an optical transfer element to the spirit level which transfers an image of the bubble vial to a viewing plane generally parallel to the vertical surface, and viewing the bubble in the viewing plane.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
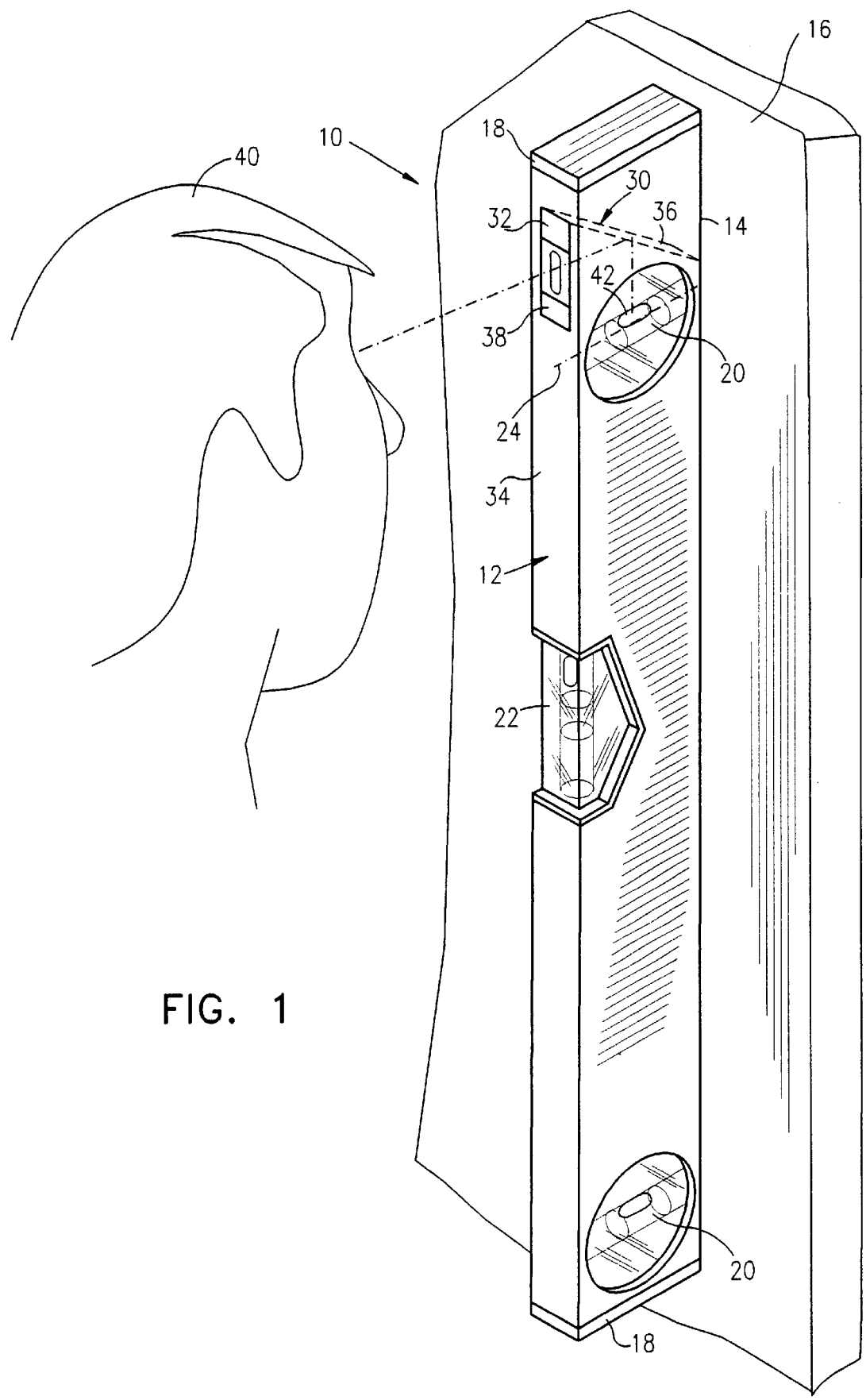
FIG. 1 is a simplified pictorial illustration of a spirit level, constructed and operative in accordance with a preferred embodiment of the present invention.

Reference is now made to FIG. 1 which illustrates a spirit level 10, constructed and operative in accordance with a preferred embodiment of the present invention. Spirit level 10 preferably includes a body 12 having a level face 14 for setting a surface 16. Body 12 is preferably made of a mechanically stable and durable metal alloy, as is well known in the art. Level face 14 typically has highly accurate flatness and smoothness. End caps 18, typically made of plastic, may be fixed to ends of body 12, as is known in the art.

Spirit level 10 preferably includes one or more bubble vials 20 mounted in body 12 for setting a vertical surface and one or more bubble vials 22 for setting a horizontal surface. Bubble vial 20 preferably has a longitudinal axis 24 generally perpendicular to level face 14.

In accordance with a preferred embodiment of the present invention, an optical transfer element 30 is fixed to body 12 which transfers an image of bubble vial 20 to a viewing plane 32 generally parallel to the surface 16 being set. Viewing plane 32 is preferably located on a face 34 of body 12 generally parallel to level face 14. As seen in FIG. 1, optical transfer element 30 preferably includes a reflective surface 36 mounted inside a hollow portion of body 12 at an angle to bubble vial 20 and to viewing plane 32 which reflects the image of bubble vial 20 to viewing plane 32. Reflective surface 36 may be a polished mirror or a prism, for example. Preferably a window 38 is cut out on face 34 so that a user 40 can conveniently view the image of bubble vial 20 on viewing plane 32.

Figure 2:
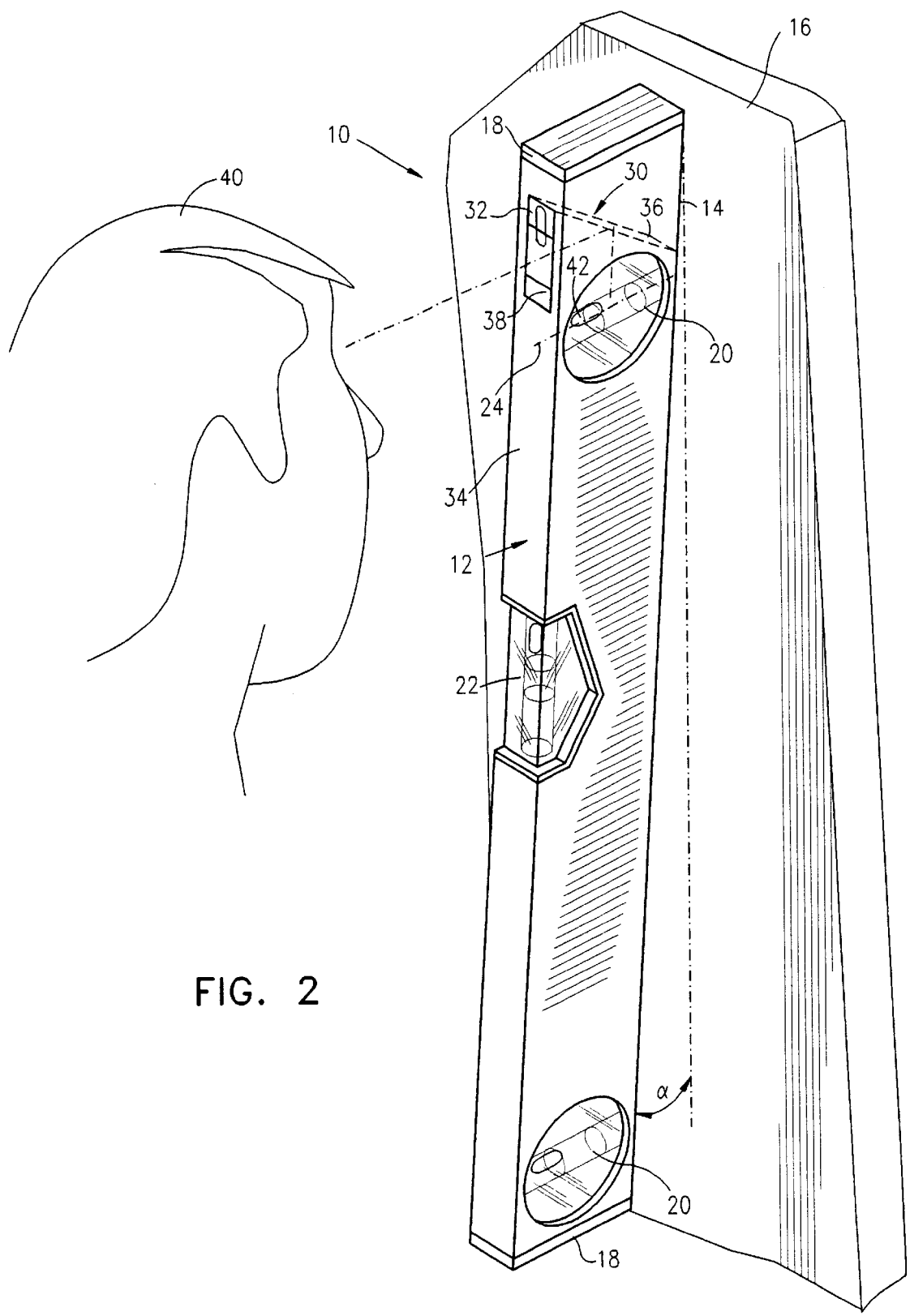
FIG. 2 is a simplified pictorial illustration of the spirit level of FIG. 1 tilted away from a vertical surface being set.

Reference is now made to FIG. 2 which illustrates spirit level 10 tilted at an angle (t relative to vertical surface 16 being set. In the orientation of FIG. 2, it is seen that moving the bottom edge of spirit level 10 away from surface 16 causes a bubble 42 to move towards user 40 and the image of bubble 42 is seen to move upwards at viewing plane 32. This is because optical transfer element 30 is located above bubble vial 20 in the orientation of FIG. 2. It is appreciated that conversely moving the top edge of spirit level 10 away from surface 16 causes bubble 42 to move away from user 40 and the image of bubble 42 is seen to move downwards at viewing plane 32.

Optical transfer element 30 may be provide with optical power. For example, optical transfer element 30 may be curved so as to enlarge or distort an image of bubble vial 20.

Figure 3:
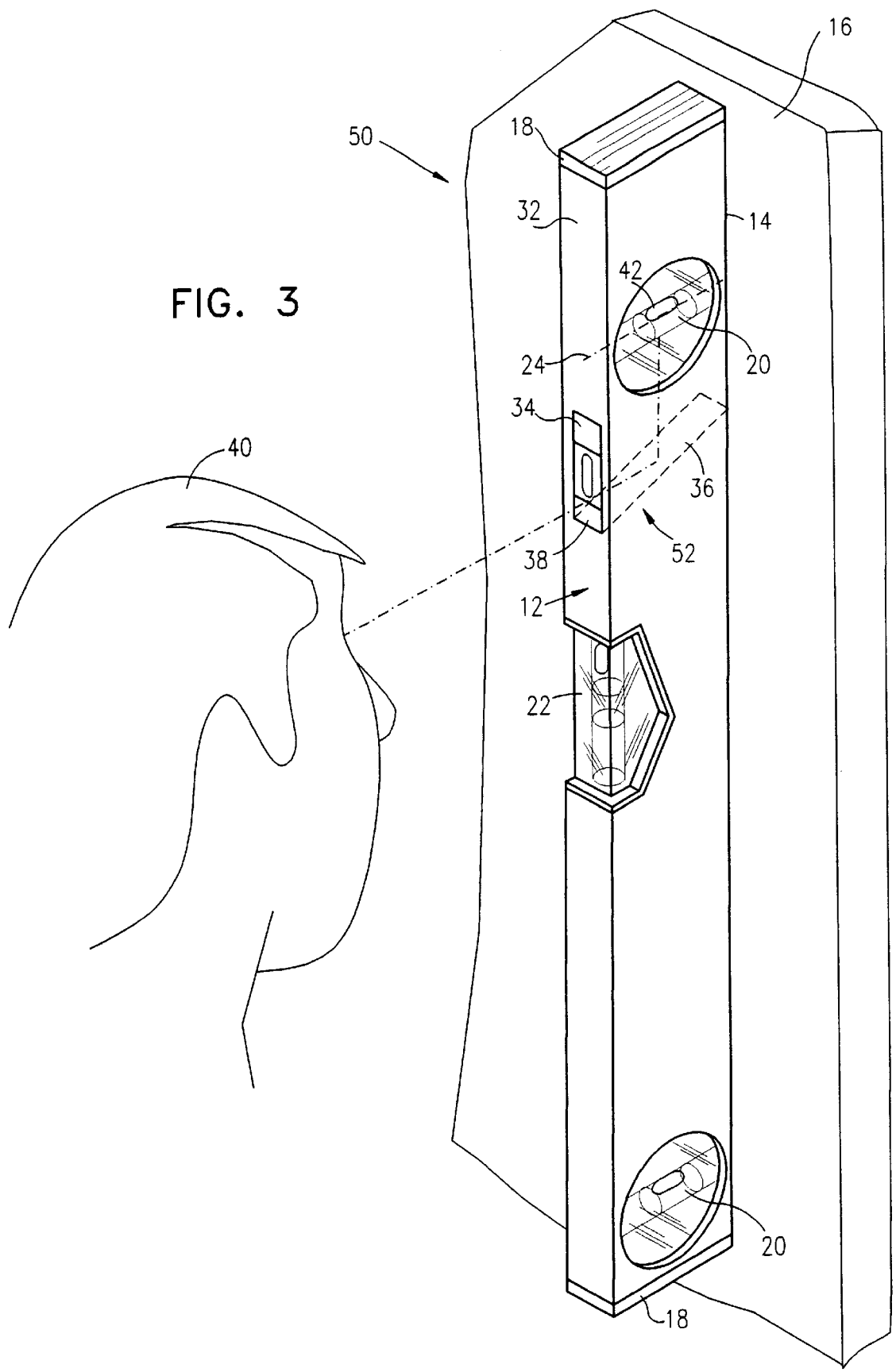
FIG. 3 is a simplified pictorial illustration of a spirit level, constructed and operative in accordance with another preferred embodiment of the present invention.

Reference is now made to FIG. 3 which illustrates a spirit level 50, constructed and operative in accordance with another preferred embodiment of the present invention. Spirit level 50 is substantially identical with spirit level 10, with like elements being referenced by like numerals. Spirit level 50 differs from spirit level 10 in that an optical transfer element 52 is mounted below bubble vial 20, the importance of which is described with reference to FIG. 4.

Figure 4:
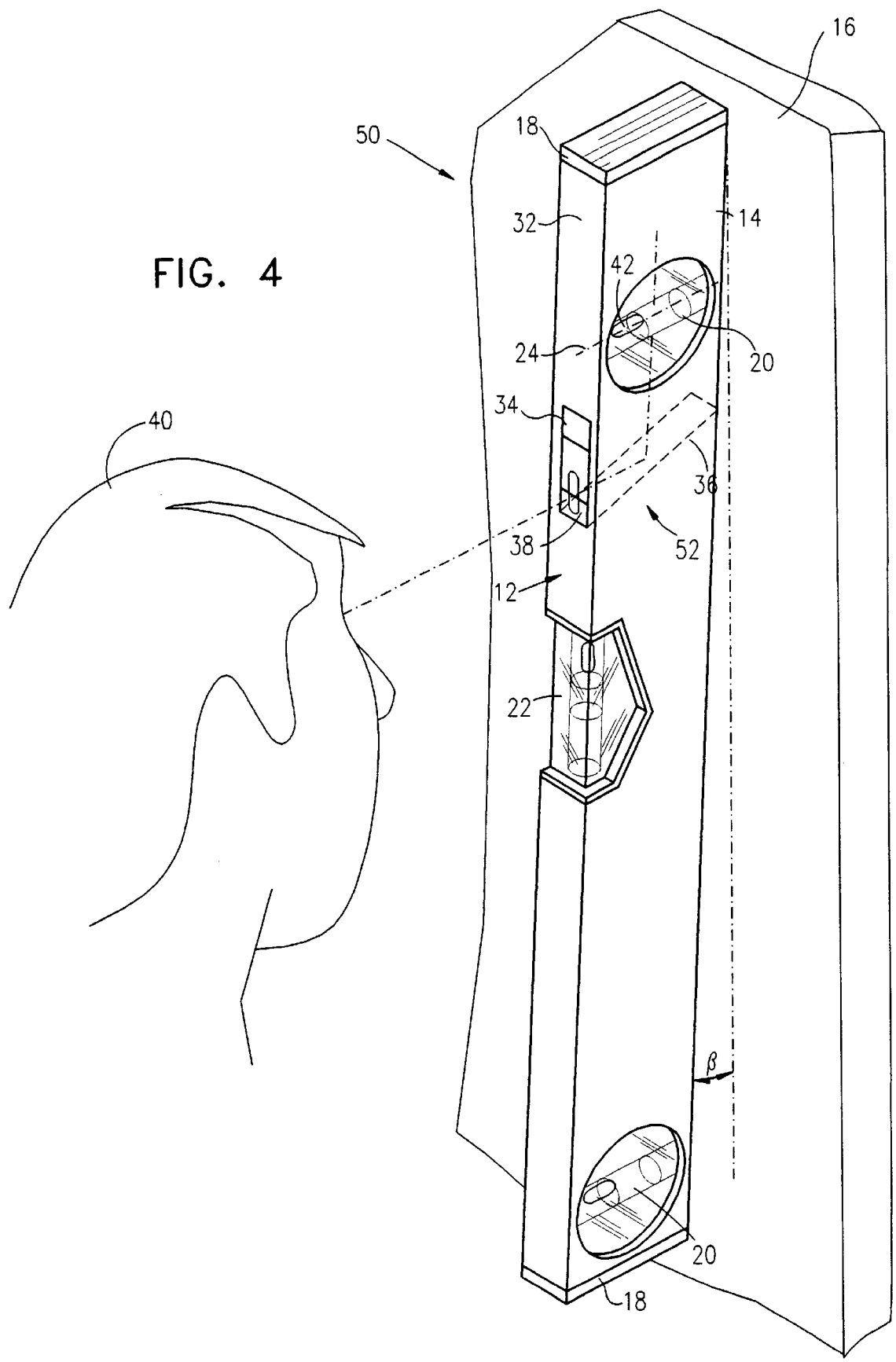
FIG. 4 is a simplified pictorial illustration of the spirit level of FIG. 3 tilted relative to a vertical surface being set.

Reference is now made to FIG. 4 which illustrates spirit level 50 tilted at an angle β relative to vertical surface 16 being set. In the orientation of FIG. 4, it is seen that tilting the bottom edge of spirit level 50 away from surface 16 causes bubble 42 to move towards user 40 and the image of bubble 42 is seen to move downwards at viewing plane 32. This is because optical transfer element 52 is located below bubble vial 20 in the orientation of FIG. 4. It is appreciated that conversely tilting the top edge of spirit level 50 away from surface 16 causes bubble 42 to move away from user 40 and the image of bubble 42 is seen to move upwards at viewing plane 32.

Figure 5:
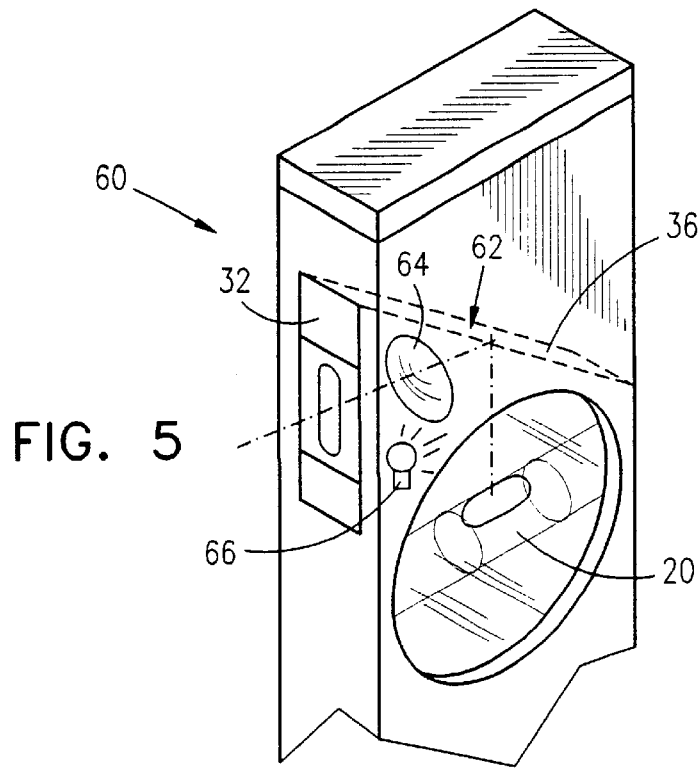
FIG. 5 is a simplified pictorial illustration of a spirit level, constructed and operative in accordance with another preferred embodiment of the present invention, and including an optical transfer element which enlarges an image of a bubble vial.

Reference is now made to FIG. 5 which illustrates a portion of a spirit level 60, constructed and operative in accordance with yet another preferred embodiment of the present invention. Spirit level 60 is substantially identical with spirit level 10, with like elements being referenced by like numerals. Spirit level 60 differs from spirit level 10 in that an optical transfer element 62 is provided that enlarges the image of bubble vial 20. This may be accomplished, for example, by disposing a magnifying lens 64 intermediate reflective surface 36 and viewing plane 32. Illumination apparatus 66, such as an electric light or LED, may be provided for illuminating the image of bubble vial 20.

Figure 6:
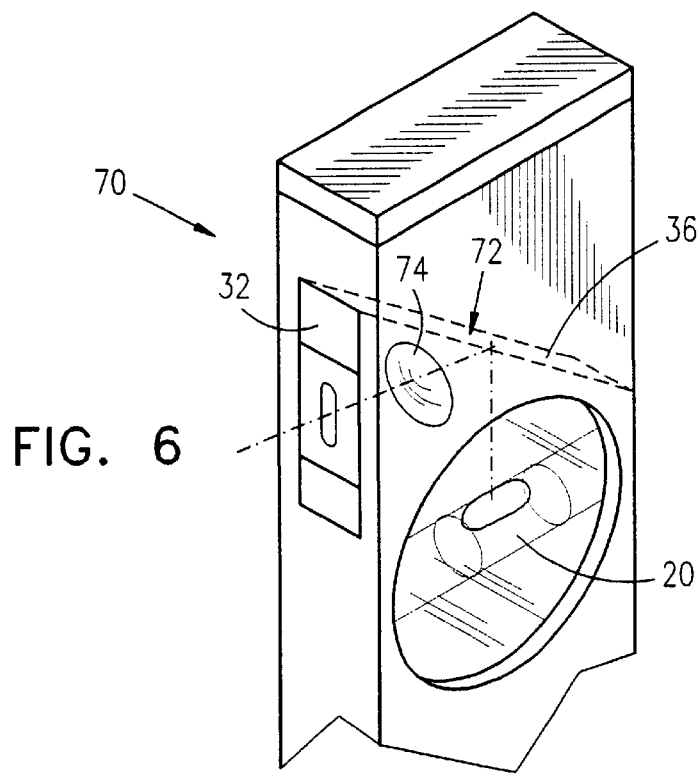
FIG. 6 is a simplified pictorial illustration of a spirit level, constructed and operative in accordance with yet another preferred embodiment of the present invention, and including an optical transfer element which diminishes a size of an image of a bubble vial.

Reference is now made to FIG. 6 which illustrates a portion of a spirit level 70, constructed and operative in accordance with still another preferred embodiment of the present invention. Spirit level 70 is substantially identical with spirit level 10, with like elements being referenced by like numerals. Spirit level 70 differs from spirit level 10 in that an optical transfer element 72 is provided that diminishes a size of the image of bubble vial 20. This may be accomplished, for example, by disposing a diminishing lens 74 intermediate reflective surface 36 and viewing plane 32.

Figure 7:
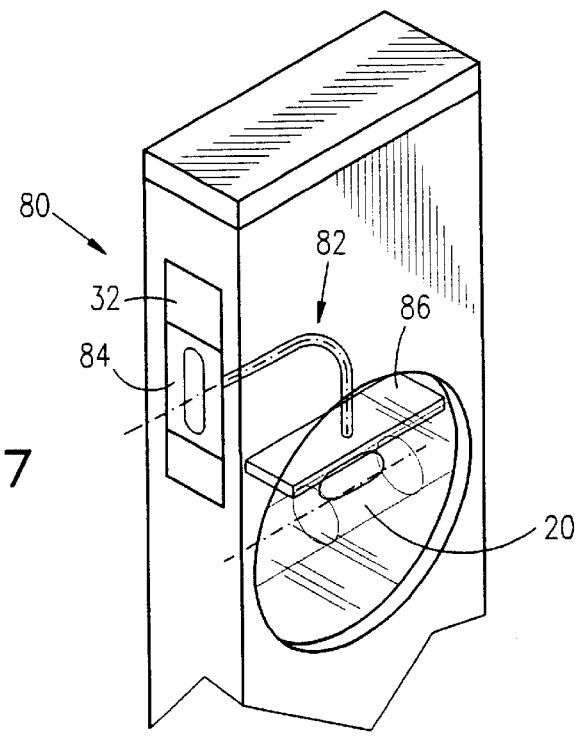
FIG. 7 is a simplified pictorial illustration of a spirit level, constructed and operative in accordance with a further preferred embodiment of the present invention, and including an optical transfer element which transfers an image of a bubble vial electrically.

Reference is now made to FIG. 7 which illustrates a portion of a spirit level 80, constructed and operative in accordance with a further preferred embodiment of the present invention. Spirit level 80 is substantially identical with spirit level 10, with like elements being referenced by like numerals. Spirit level 80 differs from spirit level 10 in that an optical transfer element 82 transfers an image of bubble vial 20 to a screen 84, such as an LCD screen, located on viewing plane 32, by means of an electric viewing device 86, such as a miniature camera. Optical transfer element 82 does not require any reflective surface.

Figure 8:
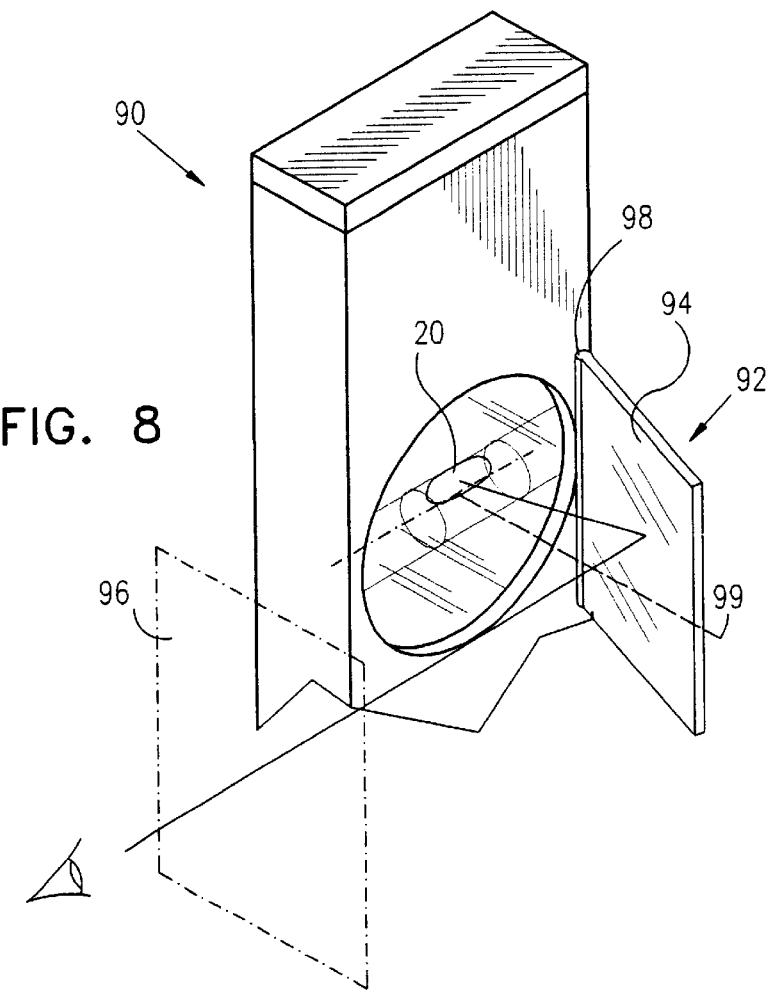
FIG. 8 is a simplified pictorial illustration of a spirit level, constructed and operative in accordance with yet a further preferred embodiment of the present invention, and including an optical transfer element which is an add-on accessory.

Reference is now made to FIG. 8 which illustrates a portion of a spirit level 90, constructed and operative in accordance with yet a further preferred embodiment of the present invention. Spirit level 90 is substantially identical with spirit level 10, with like elements being referenced by like numerals. Spirit level 90 differs from spirit level 10 in that an optical transfer element 92 is provided which is externally mounted on spirit level 90. Optical transfer element 92 preferably includes a reflective surface 94, such as a mirror or prism, which reflects an image of bubble vial 20 to a viewing plane 96 generally parallel to the surface 16 being set. Reflective surface 94 is preferably detachable from spirit level 90 and may be hinged thereto by means of a hinge 98. Thus, optical transfer element 92 may be an add-on accessory to spirit level 90.

Optical transfer element 92 may be provide with optical power. For example, optical transfer element 92 may be curved so as to enlarge or distort an image of bubble vial 20. Optical transfer element 92 may also be rotatable about an axis 99 of bubble vial 20.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A spirit level comprising:

a body having a level face for setting a surface;

at least one tubular bubble vial mounted in said body, said bubble vial having a longitudinal axis perpendicular to said level face, said level face arranged to be intermediate an end of said bubble vial and said surface to be set; and a mirror fixed to and entirely enclosed within said body which transfers an image of said bubble vial to a viewing plane parallel to said level face, said image including a bubble floating in said bubble vial and two graduation marks marked on opposite sides of a longitudinal midpoint of said bubble vial, said viewing plane being located on a viewing face of said body parallel to said level face, the ends of said bubble vial not extending beyond said level face and said viewing face, a transparent window element being located on said viewing face so that the image of said bubble vial can be viewed through said window element in a first range of viewing angles wherein a viewer can see said image transferred via said mirror, and in a second range of viewing angles wherein the viewer can see said image directly through said window element without said image being transferred via said mirror, wherein there is an unobstructed line of sight along a plane of said mirror.

2. A spirit level according to claim 1 wherein the plane of said mirror intersects said window element.

3. A spirit level according to claim 2 wherein said mirror is detachable from said spirit level.

4. A spirit level according to claim 1 wherein said mirror intersects said window element.

5. A spirit level according to claim 1 wherein the plane of said mirror intersects said level face above a vial plane, defined as a plane which is tangent to an upper surface of said bubble vial and perpendicular to said viewing face and to said level face.

6. A spirit level comprising:

a body having a level face for setting a surface:

at least one tubular bubble vial mounted in said body, said bubble vial having a longitudinal axis perpendicular to said level face, said level face arranged to be intermediate an end of said bubble vial and said surface to be set; and a mirror fixed to and entirely enclosed within said body which transfers an image of said bubble vial to a viewing plane parallel to said level face, said image including a bubble floating in said bubble vial and two graduation marks marked on opposite sides of a longitudinal midpoint of said bubble vial, said viewing plane being located on a viewing face of said body parallel to said level face, the ends of said bubble vial not extending beyond said level face and said viewing face, a transparent window element being located on said viewing face so that the image of said bubble vial can be viewed through said window element, wherein said mirror defines a plane along the surface thereof, said plane containing a line of sight which is not obstructed by said viewing face.

7. A spirit level comprising:

a body having a level face for setting a surface;

at least one tubular bubble vial mounted in said body, said bubble vial having a longitudinal axis perpendicular to said level face, said level face arranged to be intermediate an end of said bubble vial and said surface to be set;

a mirror fixed to and entirely enclosed within said body which transfers an image of said bubble vial along a first line of sight to a viewing plane parallel to said level face, said image including a bubble floating in said bubble vial and two graduation marks marked on opposite sides of a longitudinal midpoint of said bubble vial, said viewing plane being located on a viewing face of said body parallel to said level face, the ends of said bubble vial not extending beyond said level face or said viewing face; and a transparent window located on said viewing face such that along said first line of sight the image of said bubble vial transferred by said mirror can be viewed through said window, and along a second line of sight which is not parallel to said first line of sight and which passes through said window an interior portion of said body can be viewed, wherein said mirror intersects said window.

* * * * *